WILLIAM H. McNEIL.
Deoderizing Apparatus.
No. 122,273.                        Patented Dec. 26, 1871.
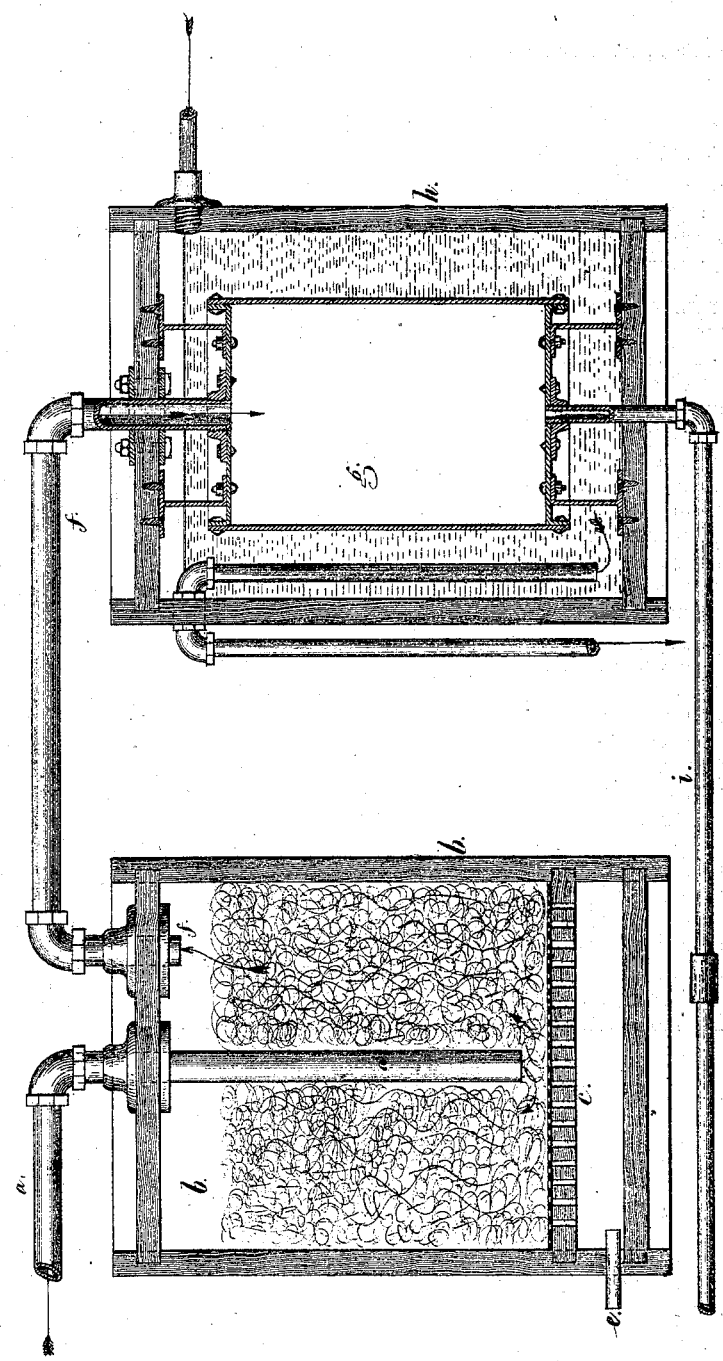

UNITED STATES PATENT OFFICE.

WILLIAM H. McNEILL, OF WEST ORANGE, NEW JERSEY.

IMPROVEMENT IN DEODORIZING THE GASES FROM LARD-BOILING, &c.

Specification forming part of Letters Patent No. 122,273, dated December 26, 1871.

*To all whom it may concern:*

Be it known that I, WILLIAM H. MCNEILL, of West Orange, in the county of Essex and State of New Jersey, have invented and made an Improvement in Deodorizing Apparatus, and the following is declared to be a correct description of the said invention.

In the melting of animal fats, the manufacture of soap, and the treatment of similar materials, there are noxious and deleterious vapors that do not condense but pass off to the sewer, and are very offensive. The condensers heretofore employed for condensing the watery vapors do not act as deodorizers, and hence the vapors that are uncondensed retain their offensive smell, and the watery matters also are offensive.

My invention is for deodorizing the vapors from the kettles of rendering establishments by passing the same through the crude creosote or heavy oil resulting from the distillation of coal-oil or tar, the said material being similar in its disinfecting properties to carbolic acid, but much less expensive. I provide a receptacle for said disinfecting liquid, and cause the vapors to pass through the same from the rendering-vat or kettle to the condenser, so that the vapors are disinfected previous to condensation; hence neither the liquid nor the uncondensed vapors are offensive or injurious.

In the drawing I have shown the apparatus which I employ and prefer by a vertical section.

The vapors from the kettle or rendering-vat pass, by the pipe $a$, into the vat $b$, within which is a perforated platform, $c$, sustaining a mass of sawdust, shavings, charcoal, or other suitable material, saturated with the disinfecting liquid aforesaid. In passing up through this mass the vapor becomes disinfected by contact with such crude creosote or its equivalent, and thence escapes, by the pipe $f$, to the condenser $g$, which is a metallic vessel immersed in water in the tank $h$, and $i$ is a pipe leading to the sewer or other escape for the gases and the liquid condensed from the vapors. The water may be supplied to the tank $h$ in any usual manner, and there may be a shower introduced into the condenser. The bottom of the vat $b$ should be provided with a pipe, $e$, for drawing off the surplus disinfecting liquid or any residuum, and the liquid may be supplied at the top of the vat in a shower whenever the sawdust or similar material requires to be saturated with the disinfecting liquid. The vapors might pass beneath the surface of the disinfecting liquid and bubble up through the same in their passage from the rendering-vat to the condenser.

I claim as my invention—

1. The method herein specified of deodorizing the vapors from the rendering-vat or kettle by subjecting the same to the action of a disinfectant previous to passing to the condenser, substantially as set forth.

2. The vat $b$, containing sawdust or equivalent material, saturated with disinfecting liquid, through which vapors from the rendering-vat or kettle pass before reaching the condenser, for the purposes and as set forth.

Signed by me this 17th day of June A. D. 1871.

W. H. McNEILL.

Witnesses:
CHAS. H. SMITH,
GEO. T. PINCKNEY.

(98)